(12) United States Patent
Su (10) Patent No.: US 11,739,881 B2
(45) Date of Patent: Aug. 29, 2023

(54) GIMBAL CONTROL METHOD, GIMBAL AND MACHINE-READABLE STORAGE MEDIUM

(71) Applicant: SZ DJI TECHNOLOGY CO., LTD., Shenzhen (CN)

(72) Inventor: Tie Su, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 0 days.

(21) Appl. No.: 17/699,780

(22) Filed: Mar. 21, 2022

(65) Prior Publication Data

US 2022/0205583 A1 Jun. 30, 2022

Related U.S. Application Data (63) Continuation of application No. 16/880,385, filed on May 21, 2020, now Pat. No. 11,280,447, which is a continuation of application No. PCT/CN2018/071534, filed on Jan. 5, 2018.

(51) Int. Cl.
| | | |
|---|---|---|
| *F16M 11/08* | (2006.01) | |
| *F16M 11/10* | (2006.01) | |
| *H04N 23/51* | (2023.01) | |
| *H04N 23/951* | (2023.01) | |

(52) U.S. Cl.
CPC .......... *F16M 11/08* (2013.01); *F16M 11/10* (2013.01); *H04N 23/51* (2023.01); *H04N 23/951* (2023.01)

(58) Field of Classification Search
CPC ...... F16M 11/08; F16M 11/10; H04N 5/2252; H04N 5/23232
USPC ....................................... 248/187.1
See application file for complete search history.

(56) References Cited

U.S. PATENT DOCUMENTS

| | | | |
|---|---|---|---|
| 10,394,107 B2 * | 8/2019 | Wang | F16M 11/18 |
| 10,890,830 B2 * | 1/2021 | Wang | F16M 11/2071 |
| 2011/0228977 A1 * | 9/2011 | Lee | H04N 5/23296 |
| | | | 348/311 |
| 2012/0229300 A1 * | 9/2012 | Fu | B60R 11/02 |
| | | | 340/901 |
| 2016/0212351 A1 * | 7/2016 | Kosaka | H04N 1/00204 |
| 2017/0138534 A1 * | 5/2017 | Chen | F16M 13/00 |
| 2017/0227162 A1 | 8/2017 | Saika et al. | |
| 2017/0301230 A1 * | 10/2017 | Liu | G03B 17/561 |

(Continued)

FOREIGN PATENT DOCUMENTS

| | | |
|---|---|---|
| CN | 102355574 A | 2/2012 |
| CN | 102662404 A | 9/2012 |

(Continued)

OTHER PUBLICATIONS

The World Intellectual Property Organization (WIPO) International Search Report for PCT/CN2018/071534 dated Oct. 8, 2018 6 Pages.

*Primary Examiner* — Muhammad Ijaz
(74) *Attorney, Agent, or Firm* — Anova Law Group, PLLC (57) ABSTRACT

A gimbal control method includes determining a current state of a follow-configuration button, determining a current follow coefficient based on the current state of the follow-configuration button, and controlling a gimbal to follow a target object according to the current coefficient. The follow-configuration button corresponds to a plurality of states, and each state corresponds to a different follow coefficient.

20 Claims, 6 Drawing Sheets

(56) References Cited

U.S. PATENT DOCUMENTS

| | | | |
|---|---|---|---|
| 2017/0307136 A1 | 10/2017 | Wei | |
| 2018/0158197 A1* | 6/2018 | Dasgupta | H04N 13/282 |
| 2020/0332944 A1* | 10/2020 | Su | F16M 11/18 |

FOREIGN PATENT DOCUMENTS

| | | |
|---|---|---|
| CN | 105223967 A | 1/2016 |
| CN | 105518757 A | 4/2016 |
| CN | 106249761 A | 12/2016 |
| CN | 106249888 A | 12/2016 |
| CN | 106774435 A | 5/2017 |
| CN | 107000839 A | 8/2017 |
| CN | 107079103 A | 8/2017 |
| JP | H05150030 A | 6/1993 |
| JP | 3959363 B2 | 8/2007 |
| JP | 2011220825 A | 11/2011 |
| JP | 2015177539 A | 10/2015 |
| JP | 2016515348 A | 5/2016 |
| WO | 2016109945 A1 | 7/2016 |

\* cited by examiner

GIMBAL CONTROL METHOD, GIMBAL AND MACHINE-READABLE STORAGE MEDIUM

CROSS-REFERENCE TO RELATED APPLICATION

This application is a continuation of U.S. application Ser. No. 16/880,385, filed on May 21, 2020, which is a continuation of International Application No. PCT/CN2018/071534, filed Jan. 5, 2018, the contents of all of which are incorporated herein by reference in their entirety.

TECHNICAL FIELD

The present disclosure relates to the field of control, and in particular, to a gimbal control method, a gimbal and a machine-readable storage medium.

BACKGROUND

With the development of shooting technology, handheld gimbals are becoming more and more popular with users. In the process of following the target object, the handheld gimbal sometimes needs to respond quickly to the motion of the handle to make the handheld gimbal closely follow the movement of the target object, and sometimes it needs to respond slowly to the motion of the handle to make pictures shot with handheld gimbal smooth.

At present, the user connects the handheld gimbal from a mobile phone APP via Bluetooth, and then sets the follow parameters such as the speed and acceleration of the handheld gimbal. In this way, the follow parameters of the handheld gimbal for following the target object can be adjusted.

However, this requires the user to pull out the mobile phone to connect with the handheld gimbal, which is a waste of time. Moreover, once the follow parameters such as the speed and acceleration of the handheld gimbal are set, it means that the speed and acceleration of the handheld gimbal are fixed. In the future, if the follow parameters such as the speed and acceleration of the handheld gimbal are required to change, a reset is needed, which has poor flexibility.

SUMMARY

In accordance with the disclosure, there is provided a gimbal including a follow-configuration button, a memory storing gimbal control instructions, and a processor configured to call the gimbal control instructions to detect whether the follow-configuration button is triggered and adjust a follow parameter of the gimbal for following a target object in response to the follow-configuration button being triggered.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts.

DETAILED DESCRIPTION OF THE EMBODIMENTS

The technical solutions in the example embodiments of the present disclosure will be described clearly with reference to the accompanying drawings. The described embodiments are only some of the embodiments of the present disclosure, rather than all the embodiments. Based on the embodiments of the present disclosure, all other embodiments obtained by a person of ordinary skill in the art without creative efforts shall fall within the scope of the present disclosure.

Before a gimbal control method provided by the present disclosure is described, the gimbal involved in the present disclosure will be described first.

The gimbal is used to carry a camera. In the embodiments of the disclosure, the gimbal can be a two-axis gimbal or a three-axis gimbal.

Figure 1:
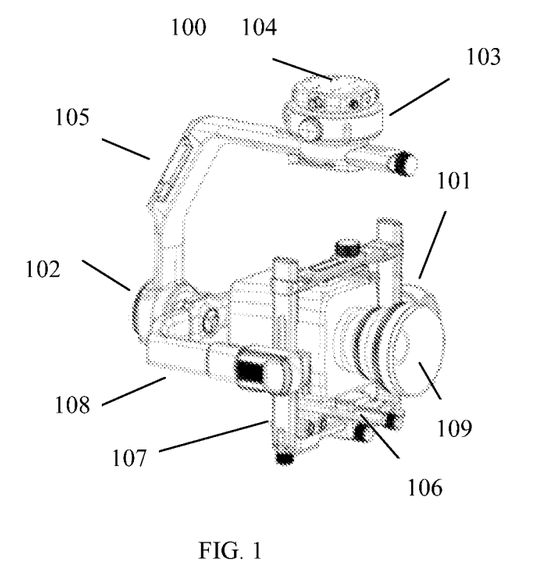
FIG. 1 is a structural diagram of a three-axis gimbal (labeled as a bracket assembly 100)

FIG. 1 is a structural diagram of a bracket assembly of a three-axis gimbal (labeled as bracket assembly 100). As shown in FIG. 1, the bracket assembly 100 mainly includes a pitch axis motor 101, a roll axis motor 102, a yaw axis motor 103, a gimbal base 104, a yaw axis arm 105, a photographing device fixation mechanism 106 (including an inertial measurement unit (IMU) inside), a pitch axis arm 107, and a roll axis arm 108. The photographing device fixation mechanism 106 is used to connect the photographing device 109 to the bracket assembly 100. The roll axis arm 108 is used to support the pitch axis arm 107 and the pitch axis motor 101, the yaw axis arm 105 is used to support the yaw axis motor 103 and the roll axis motor 102, and the pitch axis arm 107 is used to support the photographing device 109. An angle sensor and a circuit board can be installed inside the pitch axis motor 101, the roll axis motor 102, and the yaw axis motor 103 (these three motors can be referred to as driving motors). The angle sensor can be electrically connected to the circuit board. When the driving motor rotates, the angle sensor installed at the driving motor can measure the rotation angle of the driving motor. The angle sensor can be one or multiple of a potentiometer, a Hall sensor, or an encoder. The bracket assembly 100 may be connected to the handle or a mobile platform (not shown in FIG. 1) through the gimbal base 104.

The gimbal mainly uses an inertial measurement unit as a feedback element and uses the driving motors of the gimbal's axes (yaw axis, pitch axis, roll axis) as output elements to form a closed loop control system to control the attitude of the gimbal. In the process of controlling the attitude of the gimbal, the control parameter is the attitude of the gimbal. Given a target attitude, the current attitude of the gimbal is corrected to the target attitude through feedback control, so that the gimbal approaches to the target attitude from the current attitude, and finally reaches the target attitude.

Based on the above description, the embodiments of the disclosure are described below.

Figure 2:
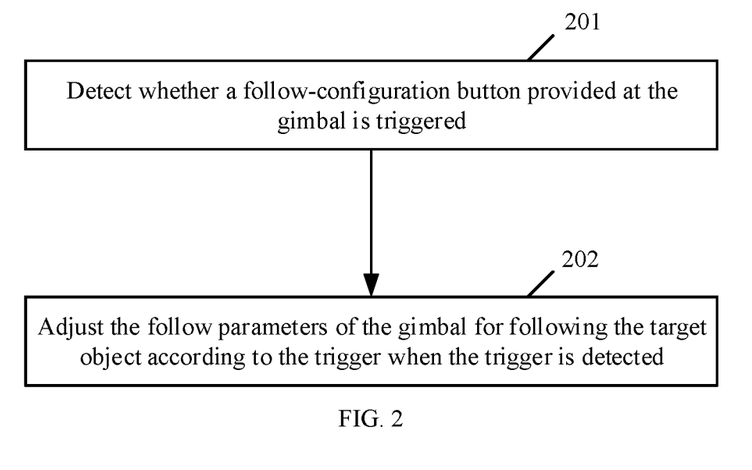
FIG. 2 is a flowchart of a gimbal control method according to an embodiment of the disclosure.

FIG. 2 is a flowchart of a gimbal control method according to an embodiment of the disclosure. This process is applied to a handheld gimbal, which includes a handle and a bracket assembly for adjusting the attitude of the gimbal. The bracket assembly includes at least one rotation axis.

As shown in FIG. 2, at 201, whether a follow-configuration button provided at the gimbal is triggered is detected.

In the embodiments of the disclosure, compared with the existing gimbal, the improvements of setting the follow-configuration button at the gimbal is made. The follow-configuration button is a physical button. In other embodiments, the follow-configuration button can be a virtual button displayed on a screen provided at the gimbal.

Figure 3:
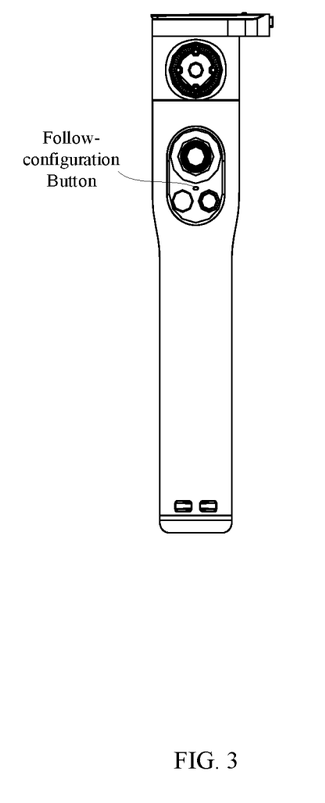
FIG. 3 is a structural diagram of a handle according to an embodiment of the disclosure.

In the embodiments of the disclosure, the gimbal is a handheld gimbal and includes a handle. The number of the physical buttons is at least one and the physical buttons are disposed at the handle. The specific position of the follow-configuration button disposed at the handle is not limited in the embodiments of the disclosure. In one example, the follow-configuration button can be set at a position at the handle that is convenient for a user to operate. FIG. 3 illustrates an example of setting a follow-configuration button at the handle.

At 202, when the trigger is detected, the follow parameters of the gimbal for following the target object are adjusted according to the trigger.

According to 202, in the embodiments of the disclosure, the follow parameters of the gimbal for following the target object are adjusted based on whether the follow-configuration button provided at the gimbal is triggered, instead of through the mobile APP. The follow parameters of the gimbal for following the target object can be ensured to be adjusted flexibly in the present disclosure.

Figure 4:
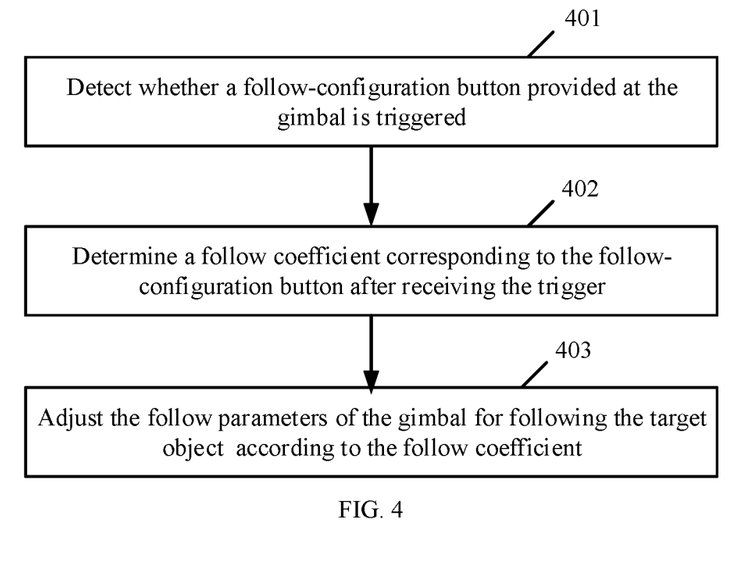
FIG. 4 is a flowchart of a gimbal control method according to an embodiment of the disclosure.

FIG. 4 is a flowchart of a gimbal control method according to another embodiment of the disclosure. As shown in FIG. 4, at 401, whether a follow-configuration button provided at the gimbal is triggered is detected.

The process of 401 is similar to the process of 201 and is not described again.

At 402, a follow coefficient corresponding to the follow-configuration button after receiving the trigger is determined.

In one embodiment, at 402, determining the follow coefficient corresponding to the follow-configuration button after receiving the trigger includes the following.

At a1, a first state of the follow-configuration button before receiving the trigger is identified.

In the embodiments of the disclosure, at least one follow-configuration button can be disposed at the gimbal.

When a relatively small number of follow-configuration buttons are disposed at the gimbal, taking one follow-configuration button as an example, and if there are many different states such as three states of high state, middle state, and low state, the same follow-configuration button will correspond to multiple different states. In this case, a2 is performed.

At a2, it is determined that the follow-configuration button sequentially switches from the first state to a second state according to a specified state cycle order after receiving the trigger.

If the specified state cycle order is middle state→high state→low state, and at a1, the first state to which the follow-configuration button corresponds before receiving the trigger is identified as middle state, then when the trigger is received, according to the specified state cycle order as middle state→high state→low state, the state of the follow-configuration button will be switched from the currently indicated first state (taking the middle state as an example) to the second state (taking the high state as an example).

After the state of the follow-configuration button is sequentially switched from the first state to the second state, a3 is performed.

At a3, a follow coefficient corresponding to the second state is determined as the follow coefficient corresponding to the follow-configuration button after receiving the trigger.

In one example, the states corresponding to the follow-configuration buttons are different, and the different states of the follow-configuration buttons correspond to different follow coefficients. In this way, at a3, the follow coefficient corresponding to the second state after the switch is determined as the follow coefficient corresponding to the follow-configuration button after receiving the trigger, and then the follow coefficient corresponding to the second state after switching can be used to adjust the follow parameters of the gimbal for following the target object. Therefore, the follow parameters of the gimbal for following the target object can be adjusted automatically. The details are described at 403 below.

In another example, the states corresponding to the follow-configuration buttons are different, and the different states of the follow-configuration buttons correspond to same follow coefficients. In this way, when the follow coefficient corresponding to the second state after switching is the same as the follow coefficient corresponding to the first state before switching, in one embodiment, the follow-configuration button may be again triggered until the follow coefficient corresponding to the state after switching is different from the follow coefficient corresponding to the state before switching. Then the follow coefficient corresponding to the state after switching can be used to adjust the follow parameters of the gimbal for following the target object. Therefore, the follow parameters of the gimbal for following the target object can be adjusted automatically. The details are described at 403 below. In another example, when the follow coefficient corresponding to the second state after switching is the same as the follow coefficient corresponding to the first state before switching, the follow-configuration button may not be triggered again. Instead, the follow parameters before switching can be directly used to control the gimbal to follow the target object.

At 403, the follow parameters of the gimbal for following the target object is adjusted according to the follow coefficient.

Finally, at 402 and 403, the adjustment of follow parameters of the gimbal for following the target object according to the trigger at 202 is implemented.

According to 402 and 403, in the embodiments of the disclosure, the follow parameters of the gimbal for following the target object are adjusted based on whether the follow-configuration button provided at the gimbal is triggered, instead of through the mobile APP. The follow parameters of the gimbal for following the target object can be ensured to be adjusted flexibly in the present disclosure.

Figure 5:
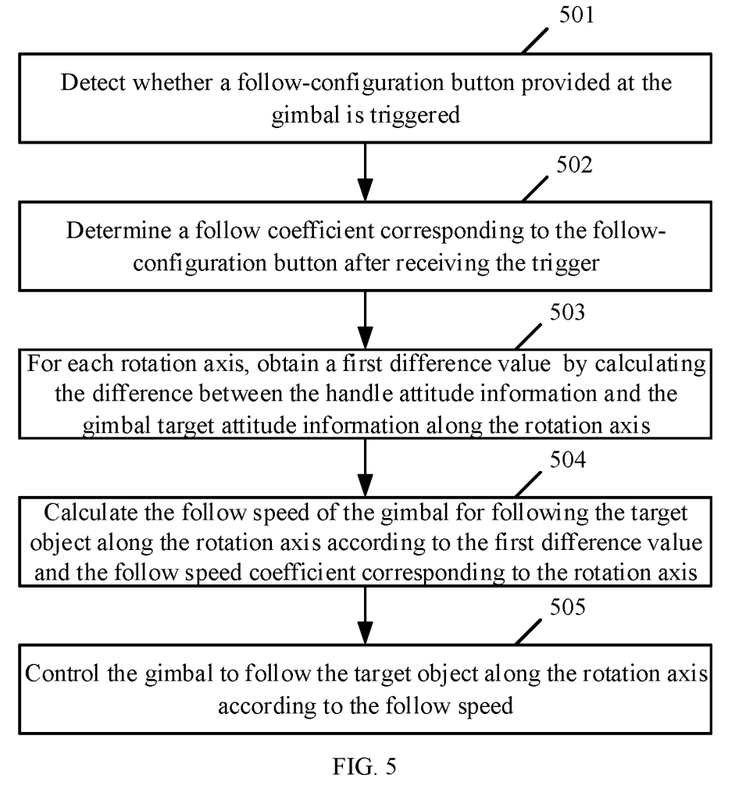
FIG. 5 is a flowchart of a gimbal control method according to an embodiment of the disclosure.

FIG. 5 is a flowchart of a gimbal control method according to another embodiment of the disclosure. In some embodiments, a follow speed is used as the follow parameter for implementing the gimbal control.

At 501, whether a follow-configuration button provided at the gimbal is triggered is detected.

The process of 501 is similar to the process of 201 and is not described again.

At 502, a follow coefficient corresponding to the follow-configuration button after receiving the trigger is determined.

The process of 502 is similar to the process of 402 and is not described again.

In the embodiments of the disclosure, the follow coefficients determined at 502 include a follow speed coefficient.

In one embodiment, the follow speed coefficients include follow speed coefficients corresponding to different rotation axes and the follow speed coefficients corresponding to different rotation axes are the same or different. In the embodiments of the disclosure, the follow speed coefficient can be pre-configured through an application program (APP). The pre-configured follow speed coefficient can be adaptively adjusted according to requirements and is not fixed.

In one embodiment, the follow coefficient may further include a follow identifier. In the embodiments of the disclosure, the follow identifier may be pre-configured through an APP. The follow identifiers corresponding to different rotation axes can be set separately. For example, the follow identifier corresponding to the roll axis is the first identifier representing to follow, the follow identifier corresponding to the yaw axis is the second identifier representing not to follow, and the follow identifier corresponding to the pitch axis is the first identifier representing to follow. In this way, 503 may further include determining the follow identifier corresponding to each rotation axis and, when the follow identifier corresponding to a rotation axis is the first identifier representing to follow, performing the processes at 503 to 504 for the rotation axis. That is, the processes at 503 and 504 are performed for a rotation axis whose corresponding follow identifier is the first identifier representing to follow.

In the embodiments of the disclosure, the states corresponding to the follow-configuration buttons are different, and the follow identifiers of the follow coefficients corresponding to different states may also be different. For example, if three different states are set for the follow-configuration button, the three different states are low state, middle state, and high state. The follow coefficients corresponding to the low state include the follow identifier corresponding to the pitch axis that is the second identifier representing not to follow, and the follow identifiers corresponding to the remaining two rotation axes (roll axis, yaw axis) that are the first identifier representing to follow, which means that only the roll axis and yaw axis follow. The follow coefficients corresponding to the middle state include the follow identifier corresponding to the roll axis that is the second identifier representing not to follow, and the follow identifier corresponding to the remaining two rotation axes (roll axis, pitch axis) that are the first identifier representing to follow, which means that only the roll axis and pitch axis follow. The follow coefficients corresponding to the high state include the follow identifiers corresponding to the pitch axis, the roll axis, and the yaw axis that are the first identifier representing to follow, which means that the pitch axis, the roll axis, and the yaw axis all follow. In specific implementations, the follow identifiers in the follow coefficients corresponding to different states may be specifically set according to actual needs and are not limited in the embodiments of the disclosure.

In one special embodiment, the follow coefficients that can also be set for a certain state, such as the low state described above, include the follow identifiers corresponding to the pitch axis, roll axis, and yaw axis that are the second identifier representing not to follow. In this case, there is no need to follow. The follow mode is stopped, and a free mode is switched to.

As described above, in the embodiments of the disclosure, the gimbal includes at least one rotation axis such as a pitch axis, a roll axis, and a yaw axis for adjusting the attitude of the gimbal. At 503, for each rotation axis, a first difference value is obtained by calculating the difference between the handle attitude information and the gimbal target attitude information along the rotation axis.

In one embodiment, at 503, the handle attitude information along the rotation axis includes a Euler angle of the handle along the rotation axis.

As an example, the Euler angle of the handle along the rotation axis includes the Euler angle of the handle along the rotation axis obtained by converting the attitude quaternion of the handle along the rotation axis, which is obtained by rotating the attitude quaternion of the inertial measurement element (IMU) itself around the rotation axis of the gimbal.

In applications, a quaternion is a mathematical representation of an attitude. In general, a quaternion can be expressed as $q=w+xi+yj+zk$, where $q=w+xi+yj+zk$ can be divided into a scalar w and a vector $xi+yj+zk$. For convenience, q is expressed as (S, V), where S represents the scalar w and V represents the vector $xi+yj+zk$. So that the quaternion multiplication can be expressed as: $q1*q2=(S1+V1)*(S2+V2)=S1*S2-V1*V2+V1XV2+S1*V2+S2*V1$. A Euler angle is another representation of an attitude. Quaternions and Euler angles can be converted to each other through corresponding formulas. The following is the formula for converting a quaternion to a Euler angle:

$$\begin{bmatrix} \varphi \\ \theta \\ \psi \end{bmatrix} = \begin{bmatrix} a\tan2(2(wx+yz), 1-2(x^2+y^1)) \\ \arcsin(2(wy-zx)) \\ a\tan2(2(wz-xy), 1-2(y^2+z^1)) \end{bmatrix}$$

Based on the above formula, in the embodiments of the disclosure, it is easy to convert the attitude quaternion of the handle along the rotation axis into the Euler angle of the handle along the rotation axis.

In another embodiment, at 503, the gimbal target attitude information along the rotation axis includes determining the gimbal target attitude information along the rotation axis according to the follow speed of the gimbal for following the target object along the rotation axis after receiving the trigger.

In one embodiment, determining the gimbal target attitude information along the rotation axis according to the follow speed of the gimbal for following the target object along the rotation axis when receiving the trigger may include obtaining the gimbal target attitude information along the rotation axis by integrating the follow speed of the gimbal for following the target object along the rotation axis after receiving the trigger. The obtained gimbal target attitude information is also an angle.

Through 503, it is realized that for each rotation axis, a first difference value is obtained by calculating the difference between the handle attitude information along the rotation axis and the gimbal target attitude information.

At 504, the follow speed of the gimbal for following the target object along the rotation axis is calculated according to the first difference value and the follow speed coefficient corresponding to the rotation axis.

In one embodiment, at 504, calculating the follow speed of the gimbal for following the target object along the rotation axis according to the first difference value and the follow speed coefficient corresponding to the rotation axis may be implemented by the following formula:

follow_speed=(atti_handler−atti_target)*speed_coef/freq, where, follow_speed represents the follow speed along the rotation axis, handler_atti represents the handle attitude information along the rotation axis; atti_target represents the gimbal target attitude information along the rotation axis; atti_handler−atti_target is the first difference value, speed_coef represents the follow speed coefficient corresponding to the rotation axis, and freq is a pre-configured frequency, specifically the frequency of IMU sampling.

Through 504, the follow speed of the gimbal for following the target object along the rotation axis can be calculated. In this way, the gimbal can be controlled to follow the target object along the rotation axis according to the calculated follow speed of the gimbal for following the target object along the rotation axis. The details are described at 505.

At 505, the gimbal is controlled to follow the target object along the rotation axis according to the follow speed.

In one embodiment, the follow speed of the gimbal for following the target object along the rotation axis is essentially the speed at which a photographing device at the gimbal, such as the photographing device 109 shown in FIG. 1, responds to a change in attitude of the rotation axis. At 505, if the absolute value of the follow speed calculated at 504 is greater than 0, it means that the photographing device at the gimbal, such as the photographing device 109 shown in FIG. 1, responds to the change in attitude of the rotation axis according to the calculated follow speed to better follow the target object. When the follow speed calculated at 504 is equal to 0, it means that the attitude of the rotation axis is close to the target attitude at this time, and the responding speed of the photographing device at the gimbal, such as the photographing device 109 shown in FIG. 1, to the change in attitude of the rotation axis is close to 0. That is, the photographing device at the gimbal, such as the photographing device 109 shown in FIG. 1, is controlled to stop following the change in attitude of the rotation axis.

Finally, processes from 502 to 505 are used to implement the adjustment of the follow parameters of the gimbal for following the target object according to the trigger at 202.

From 502 to 505 in the embodiments of the disclosure, the follow speed of the gimbal for following the target object is adjusted based on whether the follow-configuration button provided at the gimbal is triggered, instead of through the mobile APP. The follow speed of the gimbal for following the target object can be ensured to be adjusted flexibly in the present disclosure.

Figure 6:
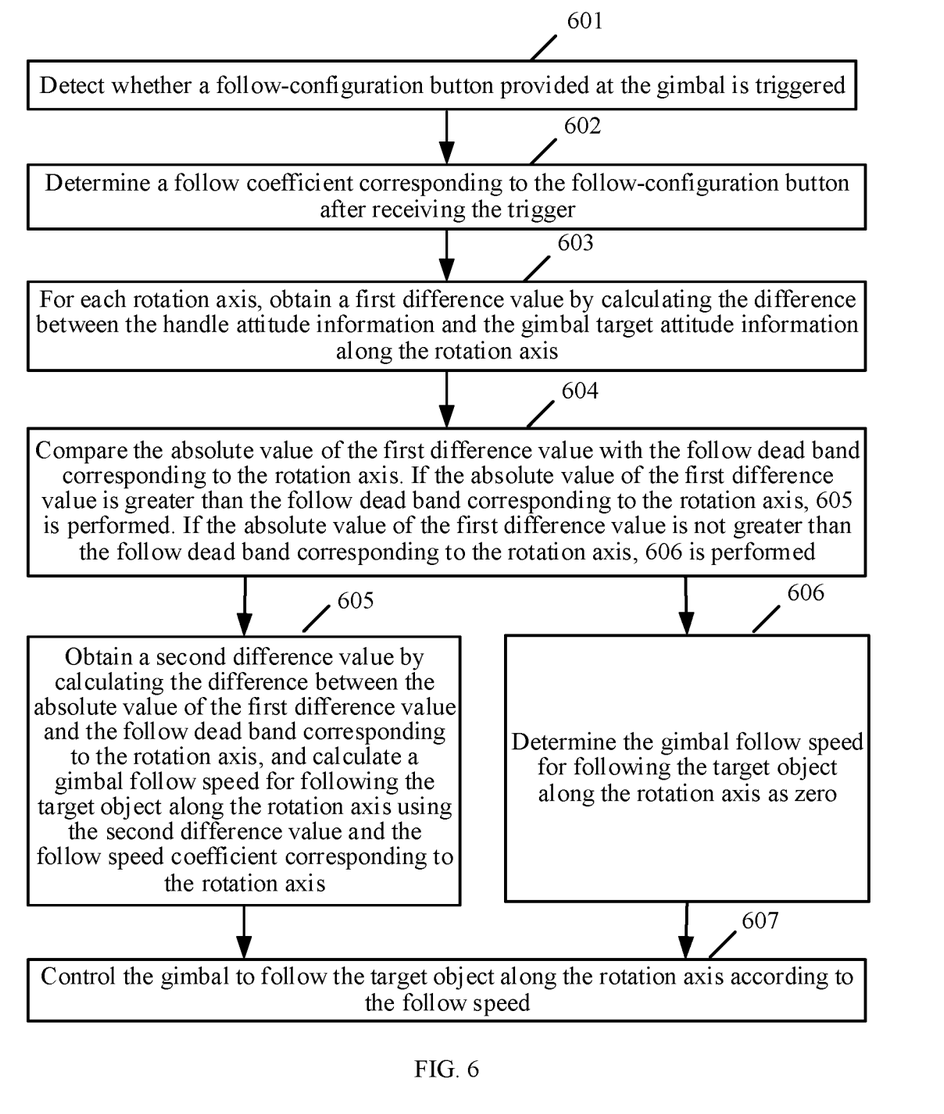
FIG. 6 is a flowchart of a gimbal control method according to an embodiment of the disclosure.

FIG. 6 is a flowchart of a gimbal control method according to another embodiment of the disclosure. As shown in FIG. 6, at 601, whether a follow-configuration button provided at the gimbal is triggered is detected.

The process of 601 is similar to the process of 201 and is not described again.

At 602, a follow coefficient corresponding to the follow-configuration button after receiving the trigger is determined.

The process of 602 is similar to the process of 402 and is not described again.

In the embodiments of the disclosure, the follow coefficient determined at 602 includes a follow speed coefficient and a follow dead band. The follow speed coefficient is as described in embodiment 3. In the embodiments of the disclosure, the follow dead band is pre-configured through the APP.

In the embodiments of the disclosure, the follow-configuration button may be set in advance with follow speed coefficients and follow dead bands corresponding to different states. In one example, the follow speed coefficients and follow dead bands can be set through the APP for the follow-configuration button. In another example, a software program may be written into the follow-configuration button in advance, so as to set a plurality of follow speed coefficients and follow dead bands corresponding to different states for the follow-configuration button.

In some embodiments, the follow-configuration button is set with the follow speed coefficients and follow dead bands corresponding to three different states, and the three different states are the low state, middle state, and high state, where the follow speed coefficient corresponding to the low state is speed_coef10 and the follow dead band corresponding to the low state is deadband201; the follow speed coefficient corresponding to the middle state is speed_coef102 and the follow dead band corresponding to the low state is deadband202; the follow speed coefficient corresponding to the high state is speed_coef103 and the follow dead band corresponding to the low state is deadband203. If initially the state corresponding to the follow-configuration button is the middle state. Thus, initially, the follow coefficients determined at 602 are the follow speed coefficient speed_coef102 and the follow dead band deadband202 corresponding to the middle state. Then, when the follow-configuration button is triggered and if the designated state cycle order is middle state→high state→low state, the state corresponding to the follow-configuration button will be switched from the original middle state to the high state. At this time, the follow coefficients determined at 602 are the follow speed_coefficient speed_coef103 and follow dead band deadban203 corresponding to the high state. If the follow-configuration button is triggered again, the state corresponding to the follow-configuration button will be switched from the original high state to the low state. At this time, the follow coefficients determined at 602 are the follow speed coefficient speed_coef101 and following dead band deadband201 corresponding to the low state. Then, if the follow-configuration button is triggered again, the state corresponding to the follow-configuration button will be switched from the original low state to the middle state. At this time, the follow coefficients determined at 602 are the follow speed coefficient speed_coef102 and follow dead band deadband202 corresponding to the middle state, and so on.

In one embodiment, the follow coefficients may further include a follow identifier. The follow identifiers corresponding to different rotation axes may be set separately. For example, the follow identifier corresponding to the roll axis is the first identifier representing to follow, the follow identifier corresponding to the yaw axis is the second identifier representing not to follow, and the follow identifier corresponding to the pitch axis is the first identifier representing to follow. In this way, 602 may further include determining the follow identifier corresponding to each rotation axis and performing the processes from 603 to 607 for the rotation axis when the follow identifier corresponding to the rotation axis is the first identifier representing to follow. That is, the processes from 603 to 607 are performed for a rotation axis whose corresponding follow identifier is the first identifier representing to follow.

In the embodiments of the disclosure, the states corresponding to the follow-configuration buttons are different, and the follow identifiers of the follow coefficients corresponding to different states may also be different. For example, if three different states are set for the follow-configuration button, the three different states are low state, middle state, and high state. The follow coefficients corresponding to the low state include the follow identifier corresponding to the pitch axis that is the second identifier representing not to follow, and the follow identifiers corresponding to the remaining two rotation axes (roll axis, yaw axis) that are the first identifier representing to follow, which means that only the roll axis and yaw axis follow. The follow coefficients corresponding to the middle state include the follow identifier corresponding to the roll axis that is the second identifier representing not to follow, and the follow identifiers corresponding to the remaining two rotation axes (roll axis, pitch axis) that are the first identifier representing to follow, which means that only the roll axis and pitch axis follow. The follow coefficients corresponding to the high state include the follow identifiers corresponding to the pitch axis, the roll axis, and the yaw axis that are the first identifiers representing to follow, which means that the pitch axis, the roll axis, and the yaw axis all follow. In specific implementations, the follow identifiers in the follow coefficients corresponding to different states may be specifically set according to actual requirements and are not limited in the embodiments of the disclosure.

In one embodiment, the follow speed coefficients include follow speed coefficients corresponding to different rotation axes and the follow speed coefficients corresponding to different rotation axes are the same or different. In the embodiments of this disclosure, the follow speed coefficient can be pre-configured. The pre-configured follow speed coefficient can be adaptively adjusted according to requirements and is not fixed.

In one embodiment, the follow dead bands include the follow dead bands corresponding to different rotation axes, where the follow dead bands corresponding to different rotation axes are the same or different. In the embodiments of the disclosure, the follow dead band may be pre-configured. The pre-configured follow dead band can be adaptively adjusted according to requirements and is not fixed.

At 603, for each rotation axis, a first difference value is obtained by calculating the difference between the handle attitude information and the gimbal target attitude information along the rotation axis.

The process of 603 is similar to the process of 503 and is not described again.

At 604, the absolute value of the first difference value is compared with the follow dead band corresponding to the rotation axis. If the absolute value of the first difference value is greater than the follow dead band corresponding to the rotation axis, 605 is performed. If the absolute value of the first difference value is not greater than the follow dead band corresponding to the rotation axis, 606 is performed.

At 605, a second difference value is obtained by calculating the difference between the absolute value of the first difference value and the follow dead band corresponding to the rotation axis, and a gimbal follow speed for following the target object along the rotation axis is calculated using the second difference value and the follow speed coefficient corresponding to the rotation axis. After that, 607 is performed.

605 is performed on the premise that the absolute value of the first difference value is greater than the follow dead band corresponding to the rotation axis.

In one embodiment, 605 may be implemented with the following formula:

atti_err=atti_handler−atti_target, where handler_atti represents handle attitude information along the rotation axis, atti_target represents the gimbal target attitude information along the rotation axis, and atti_err is the first difference value.

atti_use=|atti_err−|deadband||, where deadband is the follow dead band, and atti_use is the second difference value.

follow_speed=atti_use*speed_coef/freq, where follow_speed represents the follow speed along the rotation axis, speed_coef represents the follow speed coefficient corresponding to the rotation axis, and freq is a pre-configured frequency, specifically the frequency of the IMU sampling.

The above formulas are used to calculate the gimbal follow speed for following the target object along the rotation axis using the second difference value and the follow speedcoefficient corresponding to the rotation axis.

At 606, the gimbal follow speed for following the target object along the rotation axis is determined as zero and then 607 is performed.

606 is performed on the premise that the absolute value of the first difference value is not greater than the follow dead band corresponding to the rotation axis. When the absolute value of the first difference value is not greater than the follow dead band corresponding to the rotation axis, it means that the absolute value of the first difference value is smaller than the follow dead band corresponding to the rotation axis, or is equal to the follow dead band corresponding to the rotation axis. When the absolute value of the first difference value is smaller than the follow dead band corresponding to the rotation axis, or when the absolute value of the first difference value is equal to the follow dead band corresponding to the rotation axis, it means that the attitude of the rotation axis is close to the target attitude at this time, and the speed of the photographic device on the gimbal, such as the photographing device 109 shown in FIG. 1, in response to the attitude change of the rotational axis is close to 0. Therefore, a photographing device on the gimbal, such as the photographing device 109 shown in FIG. 1, does not need to follow the attitude change of the rotation axis.

At 607, the gimbal is controlled to follow the target object along the rotation axis according to the follow speed.

In the embodiments of the disclosure, the follow speed of the gimbal for following the target object along the rotation axis is essentially the speed at which the photographing device at the gimbal, such as the photographing device 109 shown in FIG. 1, responds to a change in attitude of the rotation axis. In one example, if 607 is performed after 605 as described above, at 607, the photographing device at the gimbal, such as the photographing device 109 shown in FIG. 1, responds to the change in attitude of the rotation axis according to the calculated follow speed to better follow the target object. In another example, if 607 is performed after 606 as described above, at 607, the attitude of the rotation axis is close to the target attitude at this time, and the responding speed of the photographing device at the gimbal, such as the photographing device 109 shown in FIG. 1, to the change in attitude of the rotation axis is close to 0. That is, the photographing device at the gimbal, such as the photographing device 109 shown in FIG. 1, does not need to follow the change in attitude of the rotation axis.

Finally, processes from 602 to 607 are used to implement the adjustment of the follow parameters of the gimbal for following the target object according to the trigger at 202.

From 602 to 607, in the embodiments of the disclosure, the follow speed of the gimbal for following the target object is adjusted based on whether the follow-configuration button provided at the gimbal is triggered, instead of through the mobile APP. The follow speed of the gimbal for following the target object can be ensured to be adjusted flexibly in the present disclosure.

Figure 7:
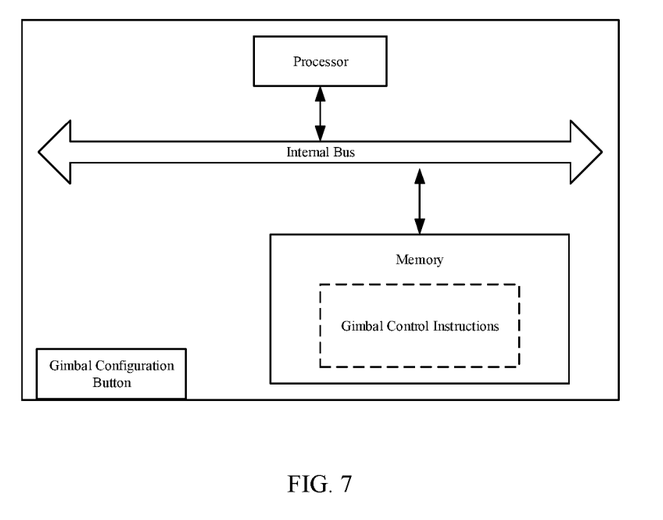
FIG. 7 is a structural diagram of a gimbal according to an embodiment of the disclosure.

FIG. 7 is a structural diagram of a gimbal consistent with the present disclosure. The gimbal includes a memory, a processor, and a follow-configuration button. The memory is used to store control instructions of the gimbal. The processor calls the control instructions and performs operations including detecting whether the follow-configuration button is triggered and adjusting the follow parameters of the gimbal for following the target object according to the trigger when the trigger is detected.

In one example, the follow-configuration button is a physical button, or the follow-configuration button can be a virtual button displayed on a screen provided at the gimbal.

In one example, the gimbal is a handheld gimbal and includes a handle. The number of the physical buttons is at least one and the physical buttons are disposed at the handle.

In one example, the processor calls the control instruction of the gimbal to perform the adjustment of the follow parameters of the gimbal for following the target object according to the trigger, which includes determining that a corresponding follow coefficient after the trigger is received by the follow-configuration button, and adjusting the follow parameters of the gimbal for following the target object according to the follow coefficient.

In one example, the processor calls the control instruction of the gimbal to perform the determination of the follow coefficient corresponding to the follow-configuration button after receiving the trigger, which includes identifying a first state corresponding to the follow-configuration button before receiving the trigger, determining that the follow-configuration button is sequentially switched from the first state to a second state according to a specified state cycle order after receiving the trigger, and determining that the follow coefficient corresponding to the second state is the follow coefficient corresponding to the follow-configuration button after receiving the trigger.

In one example, if the states corresponding to the follow-configuration buttons are different, the corresponding follow coefficients are different, or if the states corresponding to the follow-configuration buttons are different, but the corresponding follow coefficients are the same.

In one example, the follow coefficient includes a follow speed coefficient. The follow speed coefficients include follow speed coefficients corresponding to different rotation axes, and the follow speed coefficients corresponding to different rotation axes are the same or different.

In one example, the gimbal further includes at least one rotation axis for adjusting the attitude of the gimbal. In one example, the processor calls the control instruction of the gimbal to perform the adjustment of the follow parameters of the gimbal for following the target object according to the follow coefficients, which includes, for each rotation axis, obtaining a first difference value by calculating a difference between the handle attitude information and the gimbal target attitude information along the rotation axis, calculating the follow speed of the gimbal for following the target object along the rotation axis according to the first difference value and the follow speed coefficient corresponding to the rotation axis, and controlling the gimbal to follow the target object along the rotation axis according to the follow speed.

In one example, the follow coefficient further includes a follow dead band. The follow dead band includes follow dead bands corresponding to different rotation axes, and the follow dead bands corresponding to different rotation axes are the same or different.

In one example, the processor calls the control instruction of the gimbal to perform the calculation of the follow speed of the gimbal for following the target object along the rotation axis according to the calculated first difference value and the follow speed coefficient corresponding to the rotation axis, which includes comparing the absolute value of the first difference value with the follow dead band corresponding to the rotation axis. If the absolute value of the first difference value is greater than the follow dead band corresponding to the rotation axis, a second difference value is obtained by calculating the difference between the absolute value of the first difference value and the follow dead band corresponding to the rotation axis, and a gimbal follow speed for following the target object along the rotation axis is calculated using the second difference value and the follow speed coefficient corresponding to the rotation axis.

In one example, the processor calls the control instruction of the gimbal to perform the calculation of the follow speed of the gimbal for following the target object along the rotation axis according to the calculated first difference value and the follow speed coefficient corresponding to the rotation axis, which includes comparing the absolute value of the first difference value with the follow dead band corresponding to the rotation axis. If the absolute value of the first difference value is not greater than the follow dead band corresponding to the rotation axis, the gimbal follow speed for following the target object along the rotation axis is determined as zero.

In one example, the processor calls the control instruction to control the gimbal to follow the target object along the rotation axis according to the follow speed, which includes controlling the gimbal to stop following the target object along the rotation axis.

In one example, the handle attitude information along the rotation axis includes a Euler angle of the handle along the rotation axis.

The processor calls the control instruction of the gimbal to determine the Euler angle of the handle along the rotation axis, which includes obtaining the attitude quaternion of the handle along the rotation axis by rotating the attitude quaternion of the inertial measurement element (IMU) itself around the rotation axis of the gimbal and converting the attitude quaternion of the handle along the rotation axis into the Euler angle of the handle along the rotation axis.

In one example, the processor calls the control instruction of the gimbal to perform the determination of the gimbal target attitude information along the rotation axis, which includes determining the gimbal target attitude information along the rotation axis according to the follow speed of the gimbal for following the target object along the rotation axis when receiving the trigger.

In one example, the processor calls the control instruction of the gimbal to perform the determination of the gimbal target attitude information along the rotation axis according to the follow speed of the gimbal for following the target object along the rotation axis after receiving the trigger, which includes obtaining the gimbal target attitude information along the rotation axis by integrating the follow speed of the gimbal for following the target object along the rotation axis after receiving the trigger.

In one example, the follow speed coefficient can be pre-configured through an application program (APP). The pre-configured follow speed coefficient can be adaptively adjusted according to requirements.

In one example, the follow dead band can be pre-configured through an application program (APP). The pre-configured follow dead band can be adaptively adjusted according to requirements.

The present disclosure also provides a machine-readable storage medium. In this disclosure, the machine-readable storage medium includes a U disk, a mobile hard disk, a read-only memory (ROM), a random access memory (RAM), a magnetic disk, or an optical disk, and etc., which can store program codes.

In the embodiments of the present disclosure, a plurality of computer instructions are stored on the machine-readable storage medium. When the computer instructions are executed, the processing of the foregoing embodiments 1 to 4 is performed, which specifically includes detecting whether the follow-configuration button provided at the gimbal is triggered and adjusting the follow parameters of the gimbal for following the target object according to the trigger when the trigger is detected.

In one example, the follow-configuration button is a physical button, or the follow-configuration button can be a virtual button.

In one example, the number of the follow-configuration button is at least one.

In one example, the computer instruction is executed to adjust the follow parameters of the gimbal for following the target object according to the trigger, which includes determining that a corresponding follow coefficient after the trigger is received by the follow-configuration button, and adjusting the follow parameters of the gimbal for following the target object according to the follow coefficient.

In one example, the computer instruction is executed to determine the follow coefficient corresponding to the follow-configuration button after receiving the trigger, which includes identifying a first state corresponding to the follow-configuration button before receiving the trigger, determining that the follow-configuration button is sequentially switched from the first state to a second state according to a specified state cycle order after receiving the trigger, and determining that the follow coefficient corresponding to the second state is the follow coefficient corresponding to the follow-configuration button after receiving the trigger.

In one example, if the states corresponding to the follow-configuration buttons are different, the corresponding follow coefficients are different, or if the states corresponding to the follow-configuration buttons are different, but the corresponding follow coefficients are the same.

In one example, the follow coefficient includes a follow speed coefficient.

In one example, the follow speed coefficients include follow speed coefficients corresponding to different rotation axes, and the follow speed coefficients corresponding to different rotation axes are the same or different.

In one example, the computer instruction is executed to adjust the follow parameters of the gimbal for following the target object according to the follow coefficients, which includes for each rotation axis, obtaining a first difference value by calculating the difference between the handle attitude information and the gimbal target attitude information along the rotation axis, calculating the follow speed of the gimbal for following the target object along the rotation axis according to the first difference value and the follow speed coefficient corresponding to the rotation axis, and controlling the gimbal to follow the target object along the rotation axis according to the follow speed.

In one example, the follow coefficient further includes a follow dead band. The follow dead band includes follow dead bands corresponding to different rotation axes, and the follow dead bands corresponding to different rotation axes are the same or different.

In one example, the computer instruction is executed to perform the calculation of the follow speed of the gimbal for following the target object along the rotation axis according to the first difference value and the follow speed coefficient corresponding to the rotation axis, which includes comparing the absolute value of the first difference value with the follow dead band corresponding to the rotation axis. If the absolute value of the first difference value is greater than the follow dead band corresponding to the rotation axis, a second difference value is obtained by calculating the difference between the absolute value of the first difference value and the follow dead band corresponding to the rotation axis, and a gimbal follow speed for following the target object along the rotation axis is calculated using the second difference value and the follow speed coefficient corresponding to the rotation axis.

In one example, the computer instruction is executed to perform the calculation of the follow speed of the gimbal for following the target object along the rotation axis according to the calculated first difference value and the follow speed coefficient corresponding to the rotation axis, which includes comparing the absolute value of the first difference value with the follow dead band corresponding to the rotation axis. If the absolute value of the first difference value is not greater than the follow dead band corresponding to the rotation axis, the gimbal follow speed for following the target object along the rotation axis is determined as zero.

In one example, the computer instruction is executed to control the gimbal to follow the target object along the rotation axis according to the follow speed, which includes controlling the gimbal to stop following the target object along the rotation axis.

In one example, the handle attitude information along the rotation axis includes a Euler angle of the handle along the rotation axis.

In one example, the Euler angle of the handle along the rotation axis includes the Euler angle of the handle along the rotation axis obtained by converting the attitude quaternion of the handle along the rotation axis, which is obtained by rotating the attitude quaternion of the inertial measurement element (IMU) itself around the rotation axis of the gimbal.

In one example, the computer instruction is executed to perform the determination of the gimbal target attitude information along the rotation axis, which includes determining the gimbal target attitude information along the rotation axis according to the follow speed of the gimbal for following the target object along the rotation axis when receiving the trigger.

In one example, the computer instruction is executed to perform the determination of the gimbal target attitude information along the rotation axis according to the follow speed of the gimbal for following the target object along the rotation axis after receiving the trigger, which includes obtaining the gimbal target attitude information along the rotation axis by integrating the follow speed of the gimbal for following the target object along the rotation axis after receiving the trigger.

In one example, the follow speed coefficient can be pre-configured and the pre-configured follow speed coefficient can be adaptively adjusted according to requirements.

In one example, the follow dead band can be pre-configured and the pre-configured follow dead band can be adaptively adjusted according to requirements.

Since the device embodiment basically corresponds to the method embodiment, the relevant part may refer to the description of the method embodiment. The device embodiments described above are only schematic. The units described as separate components may or may not be physically separated, and the components shown as units may or may not be physical units, that is, they may be located at one place, or may be distributed across multiple network units. Some or all of the modules may be selected according to actual needs to achieve the objective of the embodiment. Those of ordinary skill in the art can understand and implement the embodiments without creative efforts.

In the present disclosure, relational terms such as first and second are only used to distinguish one entity or operation from another entity or operation, and do not necessarily require or imply that there is any such actual relationship or order between these entities or operations. The term "comprising," "including" or any other variation thereof is non-exclusive inclusion, such that a process, method, article, or device that include a series of elements include not only those elements but also other elements that are not explicitly listed, or elements that are inherent to such a process, method, article, or device. Without more restrictions, the elements defined by the sentence "including a . . . " do not exclude the existence of other identical elements in the process, method, article, or equipment that includes the elements.

The methods and devices provided by the present disclosure are described in detail above. Specific examples are used to explain the principles and implementation of the present disclosure. The descriptions of the above embodiments are only for facilitating the understanding of the present disclosure; meanwhile, for a person of ordinary skill in the art, according to the present disclosure, there will be changes in the specific implementation and application. In summary, the content of this specification is not a limitation to this disclosure.

What is claimed is:

1. A gimbal control method, comprising:
    determining a current state of a follow-configuration button, the current state being one of a plurality of states of the follow-configuration button, each of the plurality of states having one of a plurality of different follow coefficients;
    determining, based on the current state of the follow-configuration button, one of the plurality of follow coefficients as a current follow coefficient; and
    controlling, according to the current follow coefficient, a gimbal to follow a target object.

2. The gimbal control method according to claim 1, wherein:
    the follow-configuration button is a physical button or a virtual button.

3. The gimbal control method according to claim 1, wherein:
    the gimbal is a handheld gimbal; and
    the follow-configuration button is disposed at a handle of the handheld gimbal.

4. The gimbal control method according to claim 1, wherein determining the current state of the follow-configuration button includes:
    determining, according to a specified cycle order, the current state of the follow-configuration button.

5. The gimbal control method according to claim 4, further comprising:
    in response to the follow-configuration button being triggered, switching, according to the specified cycle order, the follow-configuration button from the current state to another one of the plurality of states.

6. The gimbal control method according to claim 1, wherein the current follow coefficient comprises at least one of a follow speed coefficient, a follow dead band, or a follow identifier.

7. The gimbal control method according to claim 6, wherein the gimbal has a rotation axis for adjusting a gimbal attitude, and controlling, according to the current follow coefficient, the gimbal to follow the target object includes:
    obtaining a difference value by calculating a difference between handle attitude information and gimbal target attitude information along the rotation axis;
    calculating a follow speed of the gimbal for following the target object along the rotation axis according to the difference value and the follow speed coefficient of the current follow coefficient; and
    controlling the gimbal to follow the target object along the rotation axis according to the follow speed.

8. The gimbal control method according to claim 7, wherein the difference value is a first difference value, and calculating the follow speed of the gimbal for following the target object along the rotation axis according to the difference value and the follow speed coefficient of the current follow coefficient includes:
    comparing an absolute value of the first difference value with the follow dead band of the current follow coefficient; and
    in response to the absolute value of the first difference value being greater than the follow dead band of the current follow coefficient, calculating a difference between the absolute value of the first difference value and the follow dead band of the current follow coefficient to obtain a second difference value; and
    calculating the follow speed of the gimbal for following the target object along the rotation axis using the second difference value and the follow speed coefficient of the current follow coefficient.

9. The gimbal control method according to claim 7, wherein calculating the follow speed of the gimbal for following the target object along the rotation axis according to the difference value and the follow speed coefficient of the current follow coefficient includes:
    comparing an absolute value of the difference value with the follow dead band of the current follow coefficient; and
    in response to the absolute value of the difference value being not greater than the follow dead band of the current follow coefficient, determining that the follow speed of the gimbal for following the target object along the rotation axis is zero.

10. The gimbal control method according to claim 9, wherein controlling the gimbal to follow the target object along the rotation axis according to the follow speed includes:
    controlling a photographing device at the gimbal to stop following an attitude change along the rotation axis.

11. The gimbal control method according to claim 6, wherein at least one of the follow speed coefficient, the follow dead band, or the follow identifier is preset through an application.

12. The gimbal control method according to claim 1, wherein the current follow coefficient includes a plurality of follow speed coefficients configured to control the gimbal to follow the target object along different rotation axes, respectively, and the plurality of follow speed coefficients are different.

13. The gimbal control method according to claim 1, wherein the current follow coefficient includes a plurality of follow dead bands configured to control the gimbal to follow the target object along different rotation axes, respectively, and the plurality of follow dead bands are different.

14. The gimbal control method according to claim 1, wherein the current follow coefficient includes a first follow identifier and a second follow identifier, the first follow identifier representing to follow and the second follow identifier representing not to follow.

15. The gimbal control method according to claim 1, wherein the current follow coefficient includes a plurality of follow identifiers configured to control the gimbal to follow the target object along different rotation axes, respectively, and the plurality of follow identifier are separately set.

16. The gimbal control method according to claim 1, wherein controlling, according to the current follow coefficient, the gimbal to follow the target object includes:
   determining, according to a follow identifier of the current follow coefficient, a rotation axis for following the target object; and
   controlling, based on the determined result, the rotation axis to rotate, to follow the target object.

17. A gimbal, comprising:
   one or more rotation shafts;
   a memory storing gimbal control instructions; and
   a processor configured to call the gimbal control instructions to:
      determine a current state of a follow-configuration button, the current state being one of a plurality of states of the follow-configuration button, each of the plurality of states having one of a plurality of different follow coefficients;
      determine, based on the current state of the follow-configuration button, one of the plurality of follow coefficients as a current follow coefficient; and
      control, according to the current follow coefficient, the gimbal to follow a target object.

18. The gimbal according to claim 17, wherein the current follow coefficient comprises at least one of a follow speed coefficient, a follow dead band, or a follow identifier.

19. The gimbal according to claim 17, wherein:
   the current follow coefficient includes a plurality of follow speed coefficients configured to control the gimbal to follow the target object along different rotation axes, respectively, and the plurality of follow speed coefficients are different; or
   the current follow coefficient includes a plurality of follow dead bands configured to control the gimbal to follow the target object along different rotation axes, respectively, and the plurality of follow dead bands are different; or
   the current follow coefficient includes a first follow identifier and a second follow identifier, the first follow identifier representing to follow and the second follow identifier representing not to follow.

20. The gimbal according to claim 17, wherein the processor is further configured to:
   determine, according to a follow identifier of the current follow coefficient, a rotation axis for following the target object; and
   control, based on the determined result, the rotation axis to rotate, to follow the target object.

* * * * *